United States Patent

[11] 3,587,426

| [72] | Inventor | Irving Erlichman<br>Natick, Mass. |
|---|---|---|
| [21] | Appl. No. | 713,648 |
| [22] | Filed | Mar. 18, 1968 |
| [45] | Patented | June 28, 1971 |
| [73] | Assignee | Polaroid Corporation<br>Cambridge, Mass.<br>Continuation-in-part of application Ser. No.<br>693,966, Dec. 27, 1967, now abandoned. |

[54] PHOTOGRAPHIC FILM ASSEMBLAGE
6 Claims, 4 Drawing Figs.

[52] U.S. Cl. .................................................. 95/13,
95/19
[51] Int. Cl. ...................................................... G03b 17/50
[50] Field of Search ........................................... 95/13, 19,
67

[56] References Cited
UNITED STATES PATENTS

| 1,497,260 | 6/1924 | Edtl .............................. | 95/19 |
| 2,628,545 | 2/1953 | Kurnick ......................... | 95/19 |
| 3,443,500 | 5/1969 | Norton et al. ................. | 95/19 |
| 3,447,437 | 6/1969 | Tiffany .......................... | 95/13 |
| 3,479,184 | 11/1969 | Land et al. .................... | 95/13 |

Primary Examiner—John M. Horan
Assistant Examiner—Richard M. Sheer
Attorneys—Brown and Mikulka, Robert E. Corb and Alfred E. Corrigan ABSTRACT: A photographic film assemblage including a container housing a plurality of film units including an end wall with a slot through which the film units are withdrawn, and a sheet of opaque material for preventing exposure of the film units by light admitted through openings in the container and the withdrawal of more than one film unit at a time through the slot.

FIG. I

INVENTOR.
Irving Erlichman
BY Brown and Mikulka
and
Alfred E. Corrigan
ATTORNEYS

PATENTED JUN 28 1971 3,587,426

INVENTOR.
*Irving Erlichman*

BY *Brown and Mikulka*
and
*Alfred E. Corrigan*
ATTORNEYS

PHOTOGRAPHIC FILM ASSEMBLAGE

This application is a continuation-in-part of my copending application, Ser. No. 693,966, filed Dec. 27, 1967, now abandoned.

The present invention is concerned with improvements in film assemblages or packs of the type including a container and a plurality of photosensitive elements or film units adapted to be exposed, in sequence, within the container and withdrawn therefrom following exposure. The container of a film assemblage of the foregoing type generally includes an end wall formed with a slot through which the film units are withdrawn one at a time subsequent to exposure; and also, a rear wall which may include at least one "punched-out" or integral portion which forms a spring arm for biasing the film units towards the front of the container. Alternatively, the rear wall may have at least one aperture therein for receiving a biasing means comprising a component of a camera. These openings and the slot present a problem in that light may be transmitted therethrough to inadvertently expose one or more of the film units within the container. Also, the film assemblage should be so constructed and arranged that only one film unit may be advanced through the slot at one time. Accordingly, one object of the invention is to provide, in a photographic film assemblage of the type set forth above, a container having a simple, inexpensive and effective means for preventing exposure of the film units within the container to light admitted to the interior of said container via openings therein.

Another object of the invention is to provide in a film assemblage of the foregoing type including a container having an end wall with a slot and a plurality of film units arranged in stacked relation within the container with one of said film units being in alignment with said slot, means for preventing the movement of more than one film unit at a time through said slot.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
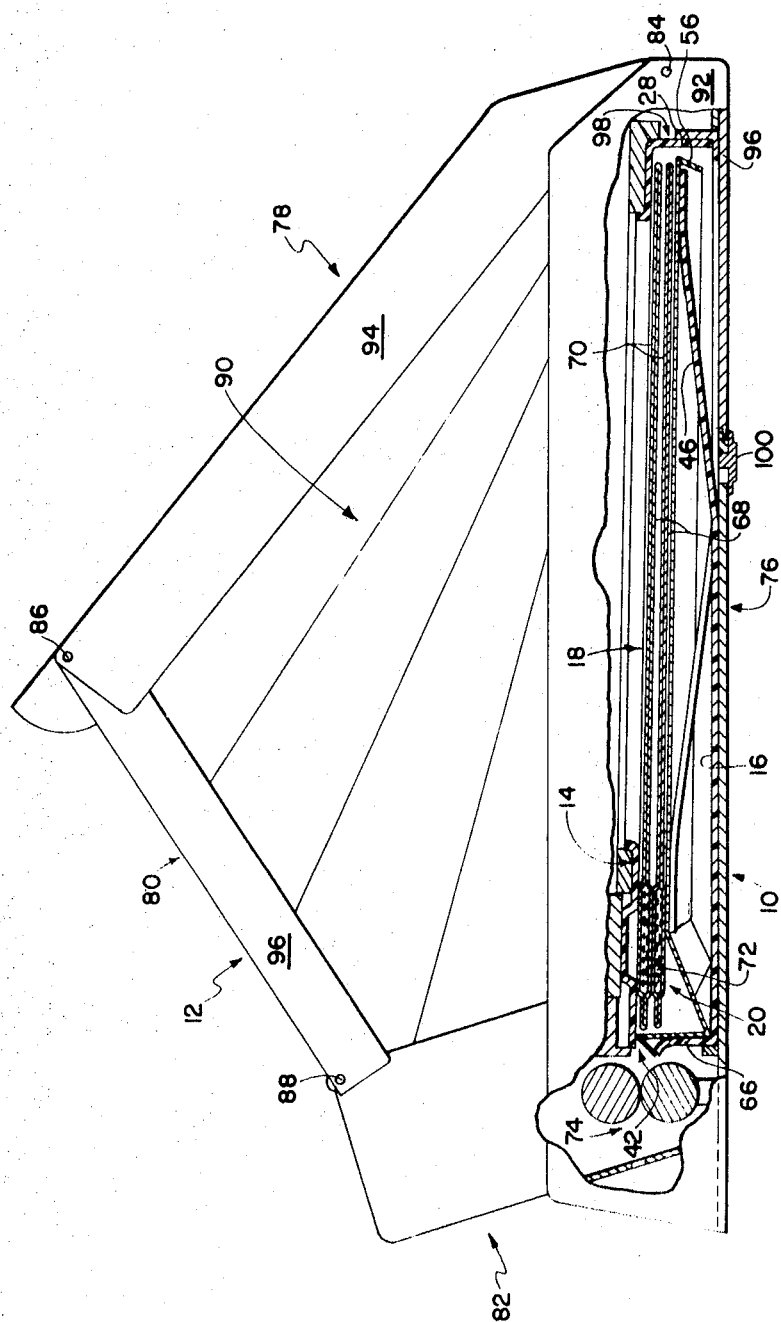
FIG. 1 is an elevation view, partially in section, of a film assemblage embodying the invention shown in a camera with which the film assemblage is adapted to be employed.

Reference is now made to FIG. 1 of the drawings wherein is illustrated the film assemblage or pack of the invention, denoted generally by reference numeral 10, shown in a camera 12. Film assemblage or pack 10 is comprised of a forward section 14, a rear section 16, a holdback light shield in the form of a sheet of opaque material 18 and a plurality of film units 20, only two of which are shown. As can be more clearly viewed in FIG. 2, forward section 14 is comprised of a forward wall 22 having an exposure aperture 24 formed therein and bordered by upturned portions 26. Wall 22 is provided with a slot 102, the function of which will be explained hereinafter. Depending from forward wall 22 is a flange 28 which extends around three sides of section 14. A fourth side of forward section 14 is provided with an integral extension 30 having depending ends 32.

Figure 2:
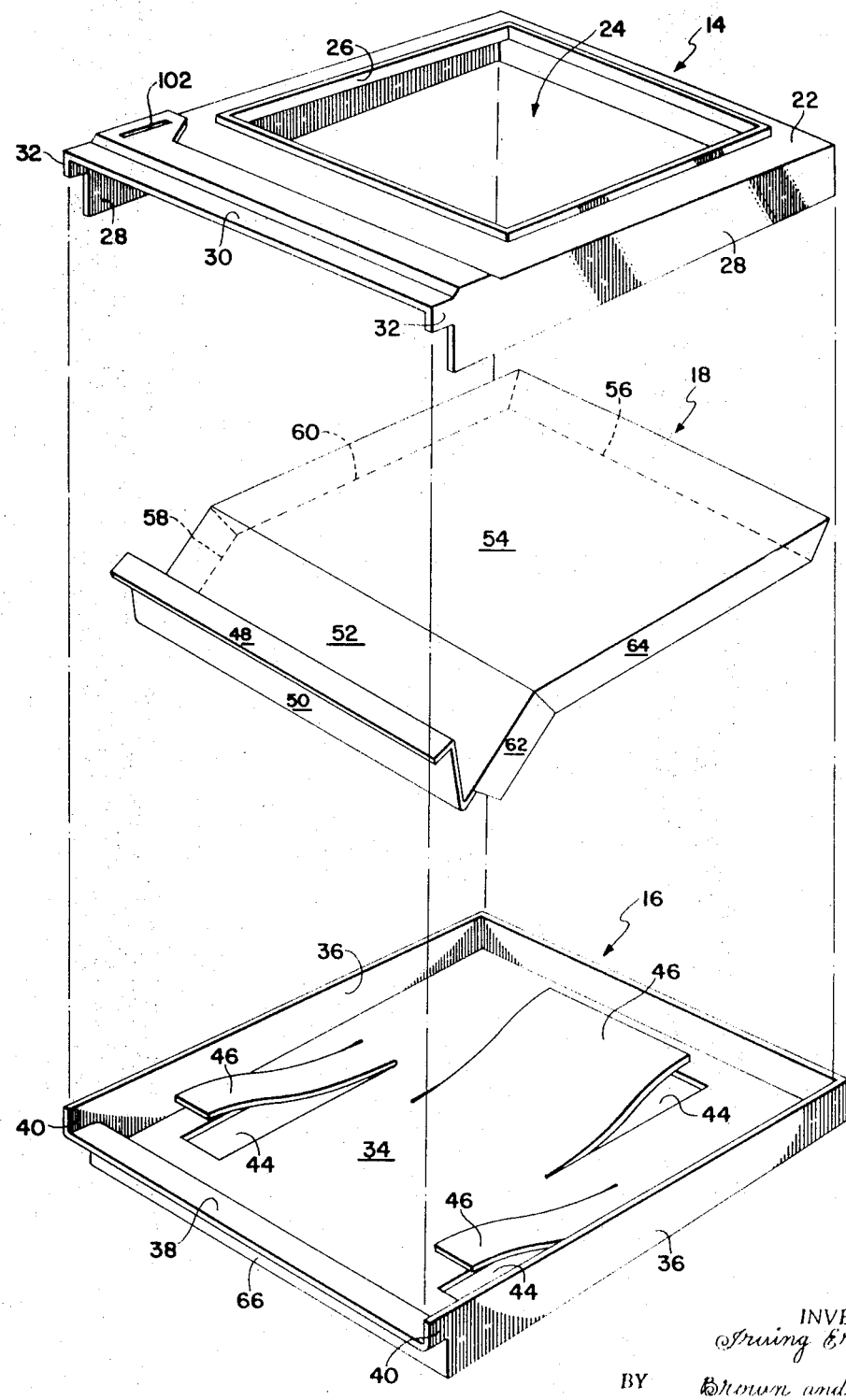
FIG. 2 is an exploded perspective view of the film assemblage of FIG. 1.

Rear section 16 is comprised of a rear wall 34 having upturned flange means 36 extending therefrom and an extension 38 having upturned ends 40. Extensions 30, 38 and their respective ends 32, 40 cooperate to define a slot or opening 42 through which the film units are withdrawn subsequent to exposure. Rear wall 34 is provided with a plurality of apertures 44, said apertures being formed by cutting or pressing sections 46 from the rear wall 34 as shown in FIG. 2. Sections 46 provide a means for resiliently biasing the film units 20 towards forward wall 22. Alternatively, the apertures could be cut out of wall 34 and covered with a sheet of opaque material and means such as springs having one end attached to the camera structure itself could pierce the opaque material and protrude through the apertures for biasing the film units towards forward wall 22. As should be apparent from FIG. 2, flange means 28 of forward section 14 fit within and abut against flange means 36 of rear section 16. Sections 14, 16 may be formed from any suitable opaque material, e.g., high impact polystyrene.

In order to prevent any light which may enter container 10 via apertures 44 from inadvertently exposing one of said film units, a sheet of opaque material 18 is positioned within the pack 10 such that the film units 20 are adjacent the side of sheet 18 which faces away from said apertures 44. Sheet 18, which may be of any appropriate material, e.g., paper, plastic, metal, is comprised of a plurality of sections 48, 50, 52, 54, 56, 58, 60, 62 and 64 interconnected by fold lines 67. As can be seen in FIGS. 1 and 2, sections 56, 60 and 64 are folded about their respective fold lines such that they make an acute angle with section 54 and sections 58 and 62 similarly make an acute angle with section 52. In its operative position as seen in FIGS. 1 and 2, sheet 18 is folded adjacent an end wall 28 of said container and extends forwardly adjacent an end wall 66 and across opening 42 and terminates in an end section 48 which extends into and across the opening 42. Sections 48, 50, 52, 54 and 56 have a width substantially equal to that of wall 34 minus twice the thickness of flange 28 and the height of section 50 is substantially that of the sum of end wall 66 and opening 42, i.e., the distance between walls 22 and 34. Accordingly, any light which may enter apertures 44 is precluded from inadvertently exposing one of the film units 20. Also, sections 48 and 50 cooperate with extensions 30, 38 to prevent the withdrawal of more than one film unit at a time from container 10 and prevent the admission of light through opening 42. As a film unit is withdrawn from the container through opening 42, the uppermost portion of section 50 is deflected to the left, as viewed in FIG. 1 thereby providing a slot the height of which is just sufficient to allow one film unit to pass therethrough. The height of the slot tends to be equal to that of the film unit as it passes therethrough due to the resiliency of the sheet 18, i.e., as the film unit deflects the upper portion of section 50 in a counterclockwise manner the resilient nature of the sheet is biasing it in a clockwise manner. If there should be any tendency of the next film unit moving while the first film unit is being withdrawn, the leading edge of the second film unit will merely abut a lower portion of section 50 and will be maintained there until the first film unit has been withdrawn. Also, by folding the sheet between sections 48 and 50 an apex is formed which not only increases the strength of the material at this point but also provides an even surface for mating with the underside of section 22. Further, although the film container has been shown as comprised of two sections, i.e., sections 14 and 16, it is within the scope of the invention to have a one-piece container.

Film units 20 are preferably of the type shown and described in detail in the U.S. Pat. application of Edwin H. Land, Ser. No. 622,287 filed Mar. 10, 1967, and Edwin H. Land et al., 622,286, 10, 1967, and now abandoned. Film units of this type each incorporates all of the materials necessary to produce a positive photographic print including a photosensitive element 68, a second or image-receiving element 70 which is transparent and is secured in face-to-face relation with the photosensitive element, and a rupturable container 72 of processing liquid secured to one end of the photosensitive and second elements for dispensing its liquid contents therebetween in response to the application of compressive pressure to the container 72. Each film unit is adapted to be processed by advancing the film unit, container 72 foremost, between a pair of pressure-applying members 74 which dispense the liquid contents of the container therefrom between the photosensitive and second elements and spread the liquid between and in contact with the two elements toward the trailing end thereof.

The image-forming process is well known in the art and involves the formation of an imagewise distribution of transferable image-forming substances in the exposed photosensitive element and diffusion of the image-forming substances to another layer within the film unit where they are deposited to form a visible, positive image. In the particular example shown herein and described in the aforementioned applications, the processing liquid includes an opacifying agent which is spread in a layer between the photosensitive element, which is preferably opaque to actinic light, and the transparent image-receiving element 70 for providing a background for the positive transfer image and masking any image formed in the photosensitive element.

Camera size can be reduced and a higher degree of compactness achieved by eliminating the necessity for a processing or imbibition chamber in the camera in which the film unit is advanced and retained in a light-free environment during image formation. Accordingly, the film unit is designed to be advanced from the camera into the light immediately as the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 70 and additionally, a desensitizing agent may be provided in the processing liquid to further insure that the photosensitive element is not exposed to the detriment of the visible image during processing outside of the camera.

Camera 12 has a substantially hexahedron configuration, the six sides including a housing having four housing sections designated generally by reference numerals 76, 78, 80 and 82 pivotally attached to each other by hinge means 84, 86, 88 and a fourth hinge means (not shown) connecting housing sections 76 and 82, and expandable members 90, only one of which is shown. Housing sections 76, 78 and 80 include, as integral parts thereof, flange members 92, 94 and 96, respectively, at each end thereof for partially overlapping expandable members 90, said flange members being at a 90° angle to the housing walls from which they are dependent. The aforementioned four housing sections and two expandable members cooperate to form a substantially light free exposure chamber therebetween. For a more detailed description of camera 12, reference is made to copending U.S. Pat. application of Land et al., Ser. No. 655,850, filed July 25, 1967 and assigned to the assignee of the instant application, now abandoned.

Section 76 of camera 12 is provided with a door 96 pivotable about hinge 84 for providing access to a chamber 98. A latch means 100 holds the door in the closed position. Located within chamber 98 is film assemblage or pack 10.

A plurality of film units 20 are provided in stacked relation in opaque container 10 and biasing means 46 resiliently biases the forwardmost film unit in position for exposure against forward wall 22 and in alignment with exit slot or opening 42. Slot 102 is provided in forward wall 22 adjacent the side thereof and in the region of the container 72 to enable engagement between the forwardmost film unit and a component of the camera for advancing the leading end of the forwardmost film unit from container 10 through slot 42 following the exposure of the film unit. For a more detailed description of the structure for withdrawing the film units from the container reference is made to my copending U.S. Pat. application Ser. No. 713,766 filed on instant date herewith, now U.S. Pat. No. 3,511,152. The film pack is initially supplied with a dark slide (not shown) located between forward wall 22 and the forwardmost film unit 20 so as to cover exposure aperture 24 and prevent the exposure of the film units. The dark slide may be initially the same size as a film unit and can be withdrawn from the film pack through slot 42 in the same manner as the film unit.

Figure 3:
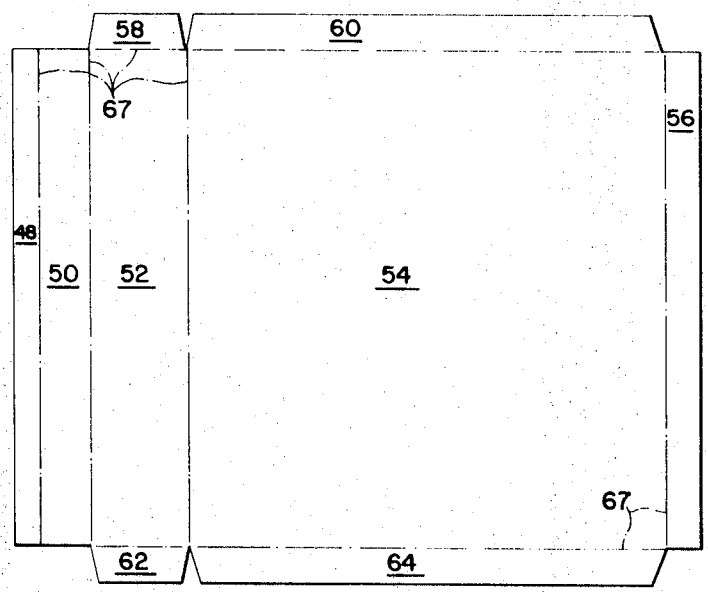
FIG. 3 is a plan view of a sheet of opaque material prior to its being shaped into its final form in which it is incorporated in the film assemblage.
Figure 4:
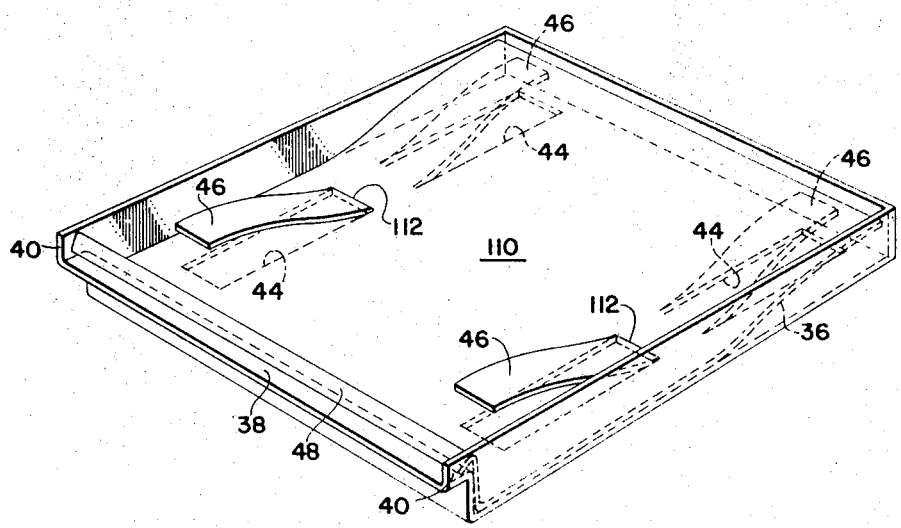
FIG. 4 is a perspective view of another embodiment of the film assemblage of the invention.

FIG. 4 shows a modification of the film assemblage shown in FIGS. 1—3. Here a sheet of opaque material 110, similar to that shown in FIGS. 1—3, is provided with a pair of slits or openings 112 through which biasing means 46 extend. It will be noted that only two of the biasing means 46 extend through sheet 110 via slits 112, the other biasing means 46 being positioned below sheet 110. The cooperation between biasing means 46 and slits 112 is such that movement of sheet 110 away from opening 42 is prevented. Also, it should be noted that although the combined holdback and light shield shown in this embodiment does not have side sections similar to those shown at 60, 64 in FIG. 3, it may so be incorporated if desired.

The present invention thus provides a simple, inexpensive and efficient means for shielding a plurality of film pack from any stray light which may enter the film container and for preventing the withdrawal of more than one film unit at a time from said container.

Since certain changes may be made in the above product without departing from the scope of the invention herein involved, it is intended that all matter contained in the above description or shown in the accompanying drawings shall be interpreted as illustrative and not in a limiting sense.

I claim:

1. A photographic film assemblage comprising, in combination:
    a container having an end wall with an opening therein, a forward wall having an exposure aperture therein, and a rear wall having at least an aperture therein;
    a plurality of film units arranged in stacked relation within said container with the ends of said film units located adjacent said end wall with the forwardmost film unit located in alignment with said opening, the latter being dimensioned to permit the passage of said film units therethrough;
    means for preventing the movement of more than one of said film units at a time through said opening, said means comprising a flexible sheet of opaque material having a first section disposed between the rearmost film unit in said stack and said rear wall of said container and having a second section extending adjacent said end wall across said opening in closing relation thereto;
    spring means positioned behind said first section of said sheet for urging said film units towards said forward wall and supporting the forwardmost film unit against said forward wall in position for exposure to light transmitted through said exposure aperture; and
    said first section of said sheet extending across said aperture in said rear wall between the latter and said film units for preventing exposure of said film units by light transmitted through said aperture in said rear wall.

2. The photographic film assemblage of claim 1 wherein said spring means is an integral portion of said rear wall.

3. The photographic film assemblage of claim 1 wherein said sheet includes means defining at least an opening therein and said spring means extends through said last-mentioned opening.

4. The photographic film assemblage of claim 1 wherein said sheet material is paper and said second section includes a folded edge section having a width approximating that of said opening and extending into said opening.

5. The photographic film assemblage of claim 1 wherein said sheet further includes lateral sections dependent from said first section extending rearwardly outside of said film units within said container.

6. The photographic film assemblage of claim 5 wherein said sheet further includes a depending trailing edge section.